(12) United States Patent
Iizuka et al.

(10) Patent No.: US 8,840,992 B2
(45) Date of Patent: Sep. 23, 2014

(54) CURABLE RESIN COMPOSITION AND OPTICAL FILM

(75) Inventors: Hiroyuki Iizuka, Chiba (JP); Kenya Ito, Chiba (JP); Koji Ohguma, Chiba (JP); Mikio Yamahiro, Chiba (JP)

(73) Assignee: JNC Corporation, Tokyo (JP)

( * ) Notice: Subject to any disclaimer, the term of this patent is extended or adjusted under 35 U.S.C. 154(b) by 251 days.

(21) Appl. No.: 12/908,187

(22) Filed: Oct. 20, 2010

(65) Prior Publication Data
US 2011/0189470 A1 Aug. 4, 2011

(30) Foreign Application Priority Data

Oct. 23, 2009 (JP) ................................ 2009-244220
Oct. 7, 2010 (JP) ................................ 2010-227170

(51) Int. Cl.
*G11B 5/708* (2006.01)
*C09D 133/08* (2006.01)
*B32B 5/16* (2006.01)

(52) U.S. Cl.
CPC ................ *B32B 5/16* (2013.01); *C09D 133/08* (2013.01)
USPC ............................ 428/323; 428/329; 428/336

(58) Field of Classification Search
USPC ......................... 428/323, 329, 336
See application file for complete search history.

(56) References Cited

U.S. PATENT DOCUMENTS

| | | |
|---|---|---|
| 2002/0018886 A1* | 2/2002 | Matsufuji et al. ............. 428/328 |
| 2003/0087087 A1* | 5/2003 | Onozawa et al. ............. 428/327 |
| 2004/0157065 A1* | 8/2004 | Miyatake et al. ............. 428/447 |
| 2004/0241429 A1* | 12/2004 | Suzuki et al. ................. 428/329 |
| 2005/0003081 A1* | 1/2005 | Nakano et al. ................ 427/160 |
| 2007/0252825 A1* | 11/2007 | Nashiki et al. ................ 345/173 |

FOREIGN PATENT DOCUMENTS

| | | |
|---|---|---|
| JP | 10-330647 | 12/1998 |
| JP | 2002-107503 | 4/2002 |
| JP | 2007-216615 | 8/2007 |

OTHER PUBLICATIONS http://chinapangshi.en.made-in-china.com/product/fbuQhxmVIjkA/China-Antimony-Trioxide-ATO-.html. (2012).*

* cited by examiner

*Primary Examiner* — Samir Shah
(74) *Attorney, Agent, or Firm* — J.C. Patents

(57) ABSTRACT

The curable resin composition of the present invention contains inorganic particles and a curable resin. The inorganic particles includes an inorganic particle (a-1) having a Mohs hardness of 7 or more and an average particle diameter of 1 μm or less, an inorganic particle (a-2) having a Mohs hardness of 4 or more to less than 7 and an average particle diameter of 1 μm or less, and an inorganic particle (a-3) having a Mohs hardness of less than 4 and an average particle diameter of 1 μm or less. The curable resin is at least one selected from a group consisting of a thermosetting resin and an active energy ray-curable resin.

12 Claims, No Drawings

CURABLE RESIN COMPOSITION AND OPTICAL FILM

CROSS-REFERENCE TO RELATED APPLICATION

This application claims the priority benefit of Japan application serial no. 2009-244220, filed on Oct. 23, 2009 and Japan application serial no. 2010-227170, filed on Oct. 7, 2010. The entirety of each of the above-mentioned patent applications is hereby incorporated by reference herein and made a part of specification.

BACKGROUND OF THE INVENTION

1. Field of the Invention

The present invention relates to a curable resin composition for a hard coat layer, a coating solution, and an optical film having a hard coat layer obtained through curing.

2. Description of Related Art

In the prior art, as for optical films such as plastic films used in various displays, a hard coat layer formed by, for example, a thermosetting resin composition or an active energy ray-curable resin composition is disposed, to improve the surface hardness. In recent years, a variety of researches for imparting functions to the hard coat layer is carried out. For example, in a study, a co-polymer containing fluorine-containing silsesquioxane is used as a mold releasing component, and is formulated into a thermosetting resin composition such as epoxy resin, to form a hard coat layer, so as to fabricate a laminated body exhibiting excellent mold releasing property by formulating a small amount of the mold releasing component (see, for example, Patent Reference 1). Due to fluorine-containing silsesquioxane, the hard coat layer has good water resistance, good oil resistance, and good anti-fouling property. However, the hard coat layer has the problem of low abrasion resistance.

In order to improve the abrasion resistance, a curable resin composition is developed with two inorganic particles having different particle diameters added (see, for example, Patent Reference 2). However, the abrasion resistance of the hard coat layer prepared with the curable resin composition is insufficient, as far as practical durability is concerned; moreover, a new problem of low scratch resistance occurs.

It is expected to develop a curable resin composition capable of overcoming these problems, a coating solution containing the curable resin composition, and an optical film having a hard coat layer fabricated with the curable resin composition or the coating solution.

REFERENCE IN THE PRIOR ART

Patent References

[Patent Reference 1] Japanese Patent Publication No. 2007-216615

[Patent Reference 2] Japanese Patent Publication No. 1998-330647

SUMMARY OF THE INVENTION

The present invention is directed to a laminated body of an optical film having a hard coat layer with excellent scratch resistance and abrasion resistance. The present invention is further directed to a curable resin composition and a coating solution containing the curable resin composition for fabricating the laminated body.

The inventors have carried out extensive researches to solve the problems above, and discovered that a laminated body fabricated by curing a curable resin composition (which is prepared by mixing a curable resin with at least three inorganic particles having different Mohs hardness) or a coating solution containing the curable resin composition has excellent scratch resistance, and abrasion resistance, and thus the present invention is completed.

That is, the present invention includes the following contents.

[1] A curable resin composition, containing inorganic particles and a curable resin, where the inorganic particles include an inorganic particle (a-1) having a Mohs hardness of 7 or more and an average particle diameter of 1 μm or less, an inorganic particle (a-2) having a Mohs hardness of 4 or more to less than 7 and an average particle diameter of 1 μm or less, and an inorganic particle (a-3) having a Mohs hardness of less than 4 and an average particle diameter of 1 μm or less; the curable resin is at least one selected from a group consisting of a thermosetting resin and an active energy ray-curable resin; and based on a total weight of the curable resin composition, a content of the inorganic particle (a-1) is from 20 wt % to 60 wt %, a content of the inorganic particle (a-2) is from 5 wt % to 20 wt %, a content of the inorganic particle (a-3) is from 0.1 wt % to 5 wt %, and a content of the curable resin is from 15 wt % to 74 wt %.

[2] The curable resin composition according to Item [1], where the inorganic particle (a-1) is at least one selected from alumina, silica, and titanium oxide, the inorganic particle (a-2) is at least one selected from tin oxide, zirconia, magnesium fluoride, cerium oxide, copper oxide, zinc oxide, apatite, fluorite, and ferric oxide, and the inorganic particle (a-3) is at least one selected from antimony oxide, cryolite, calcite, gypsum, and talc.

[3] The curable resin composition according to Item [1], further containing 0.1 wt % to 10 wt % of a curing agent based on the total weight of the curable resin composition.

[4] A coating solution, formed by the curable resin composition according to Item [1] and a solvent.

[5] A laminated body, formed by laminating a hard coat layer on a base material, where the hard coat layer is formed by curing the curable resin composition according to Item [1].

[6] The laminated body according to Item [5], where the base material is a synthetic resin film, a glass substrate, a ceramic substrate, a semiconductor substrate, or a metal substrate.

[7] The laminated body according to Item [5], where the hard coat layer is laminated on a single surface or both surfaces of the base material.

[8] An optical film, formed by the laminated body according to Item [5].

[9] A touch panel, including the optical film according to Item [8].

[10] A laminated body, formed by laminating a hard coat layer on a base material, wherein the hard coat layer is formed by curing the coating solution according to Item [4]

[11] The laminated body according to Item [10], wherein the base material is a synthetic resin film, a glass substrate, a ceramic substrate, a semiconductor substrate, or a metal substrate.

[12] The laminated body according to Item [10], wherein the hard coat layer is laminated on a single surface or both surfaces of the base material.

[13] An optical film, formed by the laminated body according to Item [10].

[14] A touch panel, comprising the optical film according to Item [13].

Effects of the Invention

A cured material with excellent scratch resistance and abrasion resistance can be obtained using the curable resin composition of the present invention. Moreover, the laminated body and the optical film fabricated with the curable resin composition have excellent scratch resistance and abrasion resistance.

BRIEF DESCRIPTION OF THE DRAWINGS

No drawings.

DESCRIPTION OF THE EMBODIMENTS

<Curable Resin Composition>

The curable resin composition of the present invention contains inorganic particles and a curable resin. The inorganic particles include an inorganic particle (a-1) having a Mohs hardness of 7 or more and an average particle diameter of 1 μm or less, an inorganic particle (a-2) having a Mohs hardness of 4 or more to less than 7 and an average particle diameter of 1 μm or less, and an inorganic particle (a-3) having a Mohs hardness of less than 4 and an average particle diameter of 1 μm or less. The curable resin is at least one selected from a group consisting of a thermosetting resin and an active energy ray-curable resin.

<Inorganic Particle (a-1)>

The inorganic particle (a-1) can be used without particular limitations, as long as the inorganic particle (a-1) is an inorganic particle having a Mohs hardness of 7 or more and an average particle diameter of 1 μm or less. The Mohs hardness is preferably 7 to 9. The average particle diameter is preferably 1 nm to 1 μm, more preferably 10 nm to 500 nm, and particularly preferably 10 nm to 50 nm. The inorganic particle (a-1) may be exemplified with alumina (having a Mohs hardness of 9), silica (having a Mohs hardness of 7), and titanium oxide (having a Mohs hardness of 7 to 7.5), with alumina and silica being preferred. The inorganic particles may be used alone or in a mixture of two or more.

<Inorganic Particle (a-2)>

The inorganic particle (a-2) can be used without particular limitations, as long as the inorganic particle (a-2) is an inorganic particle having a Mohs hardness of 4 or more to less than 7 and an average particle diameter of 1 μm or less. The average particle diameter is preferably 1 nm to 1 μm, more preferably 10 nm to 500 nm, and particularly preferably 10 nm to 50 nm. The inorganic particle (a-2) may be exemplified with tin oxide (having a Mohs hardness of 6.5), zirconia (having a Mohs hardness of 6), magnesium fluoride (having a Mohs hardness of 6), cerium oxide (having a Mohs hardness of 6), copper oxide (having a Mohs hardness of 4.5), zinc oxide (having a Mohs hardness of 4), apatite (having a Mohs hardness of 5), fluorite (having a Mohs hardness of 4), silica glass (having a Mohs hardness of 6), and ferric oxide (having a Mohs hardness of 6), with tin oxide, zirconia, and copper oxide being preferred. The inorganic particles may be used alone or in a mixture of two or more.

<Inorganic Particle (a-3)>

The inorganic particle (a-3) can be used without particular limitations, as long as the inorganic particle (a-3) is an inorganic particle having a Mohs hardness of less than 4 and an average particle diameter of 1 μm or less. The average particle diameter is preferably 1 nm to 1 μm, more preferably 10 nm to 500 nm, and particularly preferably 10 nm to 50 nm. The inorganic particle (a-3) may be exemplified with antimony oxide (having a Mohs hardness of 3), cryolite (having a Mohs hardness of 2.5 to 3), calcite (having a Mohs hardness of 3), gypsum (having a Mohs hardness of 2), a layered silicate mineral (having a Mohs hardness of 1 to 3), and talc (having a Mohs hardness of 1), with antimony oxide, and cryolite being preferred. The inorganic particles may be used alone or in a mixture of two or more.

<Combination of Inorganic Particle (a-1), Inorganic Particle (a-2), and Inorganic Particle (a-3)>

In the present invention, the so-called Mohs hardness is a standard for defining a hardness of a mineral object by scratching the mineral object with 10 selected standard minerals and observing the mineral object is first scratched by which standard mineral.

Based on the total weight of the curable resin composition, the content of the inorganic particle (a-1) is from 20 wt % to 60 wt %, preferably 20 wt % to 30 wt %, and particularly preferably 22 wt % to 28 wt %; the content of the inorganic particle (a-2) is 5 wt % to 20 wt %, preferably 5 wt % to 10 wt %, and particularly preferably 7 wt % to 10 wt %; and the content of the inorganic particle (a-3) is 0.1 wt % to 5 wt %, preferably 1 wt % to 4 wt %, and particularly preferably 1 wt % to 3 wt %. In case that the contents are in the ranges above, the obtained film may have good scratch resistance and abrasion resistance.

<Curable Resin>

The curable resin may be a thermosetting resin or an active energy ray-curable resin, and preferably an active energy ray-curable resin. The curable resin may be used alone or in a mixture of two or more. Based on the total weight of the curable resin composition, the content of the curable resin is 15 wt % to 74 wt %, preferably 20 wt % to 50 wt %, and particularly preferably 30 wt % to 50 wt %.

<Thermosetting Resin>

The thermosetting resin may be, for example, melamine resin, urethane resin, or epoxy resin. Examples of the melamine resin may include, for example, alkylated melamine resin such as methylated melamine resin and butylated melamine resin, methylol melamine resin, and imino melamine resin. Examples of the urethane resin may include, for example, polyether polyurethane resin, polyester polyurethane resin, polycarbonate polyurethane resin, and polyester polycarbonate polyurethane resin. Examples of the epoxy resin may include, for example, bis-phenol A epoxy resin, glycidyl epoxy resin, alicyclic epoxy resin, a polymer of a monomer having oxirane, or a co-polymer of a monomer having oxirane with other monomers. The thermosetting resins may be used alone or in a mixture of two or more.

In case that the thermosetting resin is used, a curing agent may be optionally added. In this case, based on the total weight of the thermosetting resin composition, the content of the curing agent is preferably 0.1 wt % to 10 wt %, more preferably 0.1 wt % to 5 wt %, and particularly preferably 0.1 wt % to 4 wt %. The curing agent may be a carboxylic acid, an amine, an acid anhydride compound, an acid generator, and a double salt of an onium salt capable of releasing a Lewis acid or a derivative thereof, and preferably a double salt of an onium salt capable of releasing a Lewis acid or the derivative thereof.

<Active Energy Ray-Curable Resin>

The active energy ray-curable resin may be a resin having a free radical polymerizable unsaturated bond, such as (meth)acrylate monomer, unsaturated polyester resin, polyester (meth)acrylate resin, epoxy(meth)acrylate resin, and urethane (meth)acrylate resin.

Examples of the (meth)acrylate monomer may include a compound obtained by reacting a polyol and an α,β-unsaturated carboxylic acid, for example, polyalkylene glycol di(meth)acrylate, ethylene glycol(meth)acrylate, propylene glycol (meth)acrylate, polyethylene polytrimethylol propane di(meth)acrylate, trimethylol propane tri(meth)acrylate, trimethylol propane ethoxytri(meth)acrylate, trimethylol propane diethoxytri(meth)acrylate, trimethylol propane triethoxytri(meth)acrylate, trimethylol propane tetraethoxytri (meth)acrylate, trimethylol propane pentaethoxytri(meth) acrylate, tetramethylolmethane tetra(meth)acrylate, tetramethylolpropane tetra(meth)acrylate, pentaerythritol tri (meth)acrylate, pentaerythritol tetra(meth)acrylate, dipentaerythritol penta(meth)acrylate, and dipentaerythritol hexa (meth)acrylate. Moreover, among compounds having a silsesquioxane backbone, a compound having a functional group of (meth)acrylate is also exemplified.

Examples of the unsaturated polyester resin may include a resin formed by dissolving a condensed product (unsaturated polyester) generated through esterification of a polyol and an unsaturated polybasic acid (and optionally, a saturated polybasic acid) into a polymerizable monomer.

The unsaturated polyester resin may be prepared by polycondensing an unsaturated acid such as maleic anhydride with a diol such as ethylene glycol. Specific examples of the resin include the resins prepared by reacting, a polybasic acid having a polymerizable unsaturated bond, such as fumaric acid, maleic acid, and itaconic acid, or an anhydride thereof, as an acid ingredient, with a polyol such as ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexan-1,4-dimethanol, an adduct of bis-phenol A with ethylene oxide, and an adduct of bis-phenol A with propylene oxide, as an alcohol ingredient. Furthermore, a polybasic acid having no polymerizable unsaturated bond such as phthalic acid, isophthalic acid, terephthalic acid, tetrahydrophthalic acid, adipic acid, and sebacic acid, or an anhydride thereof may also be optionally added as the acid ingredient for preparing the resin.

Examples of the polyester (meth)acrylate resin may include: (1) (meth)acrylate formed by reacting an epoxy compound containing an α,β-unsaturated carboxylate with a polyester terminated with a carboxyl group and prepared by reacting a saturated polybasic acid and/or an unsaturated polybasic acid with a polyol; (2) (meth)acrylate formed by reacting an acrylate containing a hydroxyl group with a polyester terminated with a carboxyl group and prepared by reacting a saturated polybasic acid and/or an unsaturated polybasic acid with a polyol; and (3) (meth)acrylate formed by reacting (meth)acrylic acid with a polyester terminated with a hydroxyl group and prepared by reacting a polybasic acid and/or an unsaturated polybasic acid with a polyol.

Examples of the saturated polybasic acid used as a raw material of polyester (meth)acrylate may include polybasic acids having no polymerizable unsaturated bond, such as phthalic acid, isophthalic acid, terephthalic acid, tetrahydrophthalic acid, adipic acid, and sebacic acid, or an anhydride thereof; and examples of polymerizable unsaturated polybasic acid may include polybasic acids having a polymerizable unsaturated bond, such as fumaric acid, maleic acid, and itaconic acid, or an anhydride thereof. Furthermore, the aforementioned unsaturated polyester is applied to the polyol ingredient.

Examples of epoxy(meth)acrylate resin may include a resin obtained by dissolving a compound (vinyl acetate) having a polymerizable unsaturated bond and generated through a ring opening reaction of a compound having a glycidyl group with a carboxyl group of a carboxyl compound having a polymerizable unsaturated bond, for example, acrylic acid, in a polymerizable monomer. The vinyl acetate is prepared through a well-known method, and examples may include epoxy(meth)acrylate obtained by reacting an epoxy resin with an unsaturated monobasic acid, such as acrylic acid or methacrylic acid. Moreover, various epoxy resins may be imparted with flexibility by reacting with bis-phenol (for example, A type) or a dibasic acid such as adipic acid, sebacic acid, and a dimmer acid (HARIDIMER 270S; Harima Chemicals, Inc.). Examples of the epoxy resin used as raw material may include, for example, bis-phenol A diglycidyl ether, and a high molecular-weight homologue thereof, and a novolac glycidyl ether.

Examples of urethane (meth)acrylate resin may include, for example, an oligomer containing a free-radical polymerizable unsaturated group, which may be obtained by reacting a polyisocyanate with a polyhydroxy compound or a polyol, and then further reacting with a (meth)acryl compound containing a hydroxyl group and optionally an allyl ether compound containing a hydroxyl group.

Specific examples of the polyisocyanate may include 2,4-toluene diisocyanate and an isomer thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthylene diisocyanate, triphenylmethane triisocyanate, Burnock D-750, CRISVON NK (trade name; manufactured by DIC Corporation), Desmodur L (trade name; manufactured by Sumitomo Bayer Urethane Co., Ltd.), CORONATE L (trade name; manufactured by Nippon Polyurethane Industry Co., Ltd.), Takenate D102 (trade name; manufactured by Mitsui Takeda Chemicals Inc.), Isonate 143L (trade name; manufactured by Mitsubishi Chemical Corporation).

Examples of the polyhydroxy compound may include a polyester polyol and a polyether polyol. Specific examples may include, for example, glycerol-ethylene oxide adduct, glycerol-propylene oxide adduct, glycerol-tetrahydrofuran adduct, glycerol-ethylene oxide-propylene oxide adduct, trimethylol propane-ethylene oxide adduct, trimethylol propane-propylene oxide adduct, trimethylol propane-tetrahydrofuran adduct, trimethylol propane-ethylene oxide-propylene oxide adduct, dipentaerythritol-ethylene oxide adduct, dipentaerythritol-propylene oxide adduct, dipentaerythritol-tetrahydrofuran adduct, and dipentaerythritol-ethylene oxide-propylene oxide adduct.

Specific examples of the polyol may include, for example, ethylene glycol, diethylene glycol, triethylene glycol, polyethylene glycol, propylene glycol, dipropylene glycol, polypropylene glycol, 2-methyl-1,3-propanediol, 1,3-butanediol, an adduct of bis-phenol A with propylene oxide or ethylene oxide, 1,2,3,4-tetrahydroxylbutane, glycerol, trimethylol propane, 1,3-butanediol, 1,2-cyclohexane glycol, 1,3-cyclohexane glycol, 1,4-cyclohexane glycol, p-xylene glycol, bicyclohexyl-4,4-diol, 2,6-decaline glycol, and 2,7-decaline glycol.

The (meth)acryl compound containing a hydroxyl group is not particularly limited, and is preferably (meth)acrylate containing a hydroxyl group. Specific examples may include, for example, 2-hydroxylethyl(meth)acrylate, 2-hydroxylpropyl (meth)acrylate, 3-hydroxylbutyl(meth)acrylate, polyethylene glycol mono(meth)acrylate, polypropylene glycol mono (meth)acrylate, tris(hydroxylethyl)polyisocyanurate (meth) acrylate, and pentaerythritol tri(meth)acrylate.

In case that the active energy ray-curable resin is used, a curing agent is optionally added. In this case, based on the total weight of the curable resin composition, the content of the curing agent is preferably 0.1 wt % to 10 wt %, more preferably 0.1 wt % to 5 wt %, and particularly preferably 0.1 wt % to 4 wt %. The curing agent may be an active energy ray polymerization initiator. The active energy ray polymerization initiator is not particularly limited, as long as it is a compound capable of generating a free radical when being irradiated with an active energy ray such as UV ray or visible light. Compounds useful as the active energy ray polymerization initiator include benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenylketone, isopropylbenzoin ether, isobutylbenzoin ether, 2,2-diethoxyacetophenone, 2,2-dimethoxy-2-phenylacetophenone, camphorquinone, benzanthrone, 2-methyl-1-[4-(methylthio)phenyl]-2-morpholinopropan-1-one, 2-benzyl-2-dimethylamino-1-(4-morpholinophenyl)-butanone, ethyl 1,4-dimethylaminobenzoate, isoamyl 4-dimethylaminobenzoate, 4,4'-di(t-butylperoxycarbonyl)benzophenone, 3,4,4'-tris(t-butylperoxycarbonyl)benzophenone, 2,4,6-trimethylbenzoyldiphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzoxazole, 2-mercaptobenzoxazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyecarbazole, 3,6-bis(2-methyl-2-morpholinopropionyl)-9-n-dodecylcarbazole, 1-hydroxycyclohexylphenylketone, bis($\eta^5$-2,4-cyclopentadien-1-yl)-bis(2,6-difluoro-3-(1H-pyrrol-1-yl)-phenyl)titanium. These compounds may be used alone or in a mixture of two or more. 3,3',4,4'-tetrakis(t-butyloxycarbonyl)benzophenone, 3,3',4,4'-tetrakis(t-hexyloxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, and 4,4'-di(methoxycarbonyl)-3,3'-di(t-butylperoxycarbonyl)benzophenone are preferred.

<Solvent>

In preparation of the laminated body and the optical film of the present invention, a solvent may be added to the curable resin composition to prepare a coating solution. Examples of the used solvent include: a hydrocarbon solvent (for example, benzene and toluene), an ether solvent (for example, diethyl ether, tetrahydrofuran, diphenyl ether, anisole, and dimethoxybenzene), a halohydrocarbon solvent (for example, dichloromethane, chloroform, and chlorobenzene), a ketone solvent (for example, acetone, butanone, and methylisobutylketone), an alcohol solvent (for example, methanol, ethanol, propanol, isopropanol, butanol, and t-butanol), a nitrile solvent (for example, acetonitrile, propionitrile, and benzonitrile), an ester solvent (for example, ethyl acetate and butyl acetate), a carbonate solvent (for example, ethylene carbonate and propylene carbonate), an amide solvent (for example, N,N-dimethylformide, and N,N-dimethylacetamide), a hydrochlorofluorocarbon solvent (for example, HCFC-141b and HCFC-225), a hydrofluorocarbon solvent (HFC having a carbon number of 2 to 4, and 5 and 6 and more), a perfluorocarbon solvent (for example, perfluoropentane and perfluorohexane), an alicyclic hydrofluorocarbon solvent (for example, fluorocyclopentane and fluorocyclobutane), an oxygen- and fluorine-containing solvent (for example, fluoroether, fluoropolyether, fluoroketone, and fluoroalcohol), a fluorine-containing aromatic solvent (for example, $\alpha,\alpha,\alpha$-trifluorotoluene and hexafluorobenzene), and water. The solvents may be used alone or in a mixture of two or more.

The amount of the solvent used is not particularly limited, and is preferably 0.1 to 2, more preferably 1 to 1.5 times of the total amount of the curable resin composition.

<Additive>

In preparation of the laminated body and the optical film of the present invention, the curable resin composition may optionally contain an anti-oxidant. By containing an anti-oxidant, a deterioration caused by oxidation can be prevented and a slightly colored optical film can be obtained. Examples of the anti-oxidant include a phenol anti-oxidant, a sulfur anti-oxidant, and a phosphorus anti-oxidant. The preferred content proportion of the anti-oxidant used is not particularly limited, and is preferably 0.0001 wt % to 0.1 wt %, more preferably 0.01 wt % to 0.1 wt %, based on the total weight of the curable resin composition.

Specific examples of the anti-oxidant include a monophenol (for example, 2,6-di-t-butyl-p-cresol, butylated hydroxylanisole, and 2,6-di-t-butyl-p-ethylphenol, stearyl-$\beta$-(3,5-di-t-butyl-4-hydroxylphenyl)propionate), a bis-phenol (for example, 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), and 3,9-bis[1,1-dimethyl-2-{$\beta$-(3-t-butyl-4-hydroxy-5-methylphenyl)propionyloxy}ethyl]2,4,8,10-tetraoxaspiro[5,5]undecane), a polymer phenol (for example, 1,1,3-tris(2-methyl-4-hydroxy-5-t-butylphenyl)butane, 1,3,5-trimethyl-2,4,6-tris(3,5-di-t-butyl-4-hydroxylbenzyl)benzene, tetrakis-[methylene-3-(3',5'-di-t-butyl-4'-hydroxylphenyl)propionate]methane, bis[3,3'-bis-(4'-hydroxy-3'-t-butylphenyl)butylc acid]glycol ester, 1,3,5-tris(3',5'-di-t-butyl-4'-hydroxylbenzyl)-s-triazin-2,4,6-(1H,3H,5H)trione, and tocopherol), a sulfur anti-oxidant (for example, dilauryl-3,3'-thiodipropionate, dimyristyl-3,3'-thiodipropionate, and distearyl-3,3'-thiodipropionate), a phosphite (for example, triphenylphosphite, diphenylisodecyl phosphite, phenyldiisodecyl phosphite, tris(nonylphenyl)phosphite, diisodecyl pentaerythritol phosphite, tris(2,4-di-t-butylphenyl)phosphite, cyclic neopentanetetraylbis(octodecyl)phosphite, cyclic neopentanetetraylbi(2,4-di-t-butylphenyl)phosphite, cyclic neopentanetetraylbi(2,4-di-t-butyl-4-methylphenyl)phosphite, and bis[2-t-butyl-6-methyl-4-{2-(octadecyloxy carbonyl)ethyl}phenyl]hydrogenphosphite), and an oxaphosphaphenanthrene oxide (for example, 9,10-dihydro-9-oxa-10-phosphaphenanthrene-10-oxide, 10-(3,5-di-t-butyl-4-hydroxylbenzyl)-9,10-dihydro-9-oxa-10-phosphaphenanthrene-10-oxide, and 10-decyloxy-9,10-dihydro-9-oxa-10-phosphaphenanthrene-10-oxide). The oxidants may be used alone and particularly preferably in a combination of a phenol anti-oxidant/sulfur anti-oxidant or a phenol anti-oxidant/phosphorous anti-oxidant. Commercially available phenol anti-oxidants include IRGANOX 1010 (trade name) or IRGAFOS 168 (trade name) manufactured by Ciba Japan K.K., which may be used alone or in a mixture thereof.

In preparation of the laminated body and the optical film of the present invention, the curable resin composition may further contain a UV absorbent, to improve the light resistance. The UV absorbent used may be a commonly used UV absorbent for plastics, the preferred content proportion is not particularly limited. Based on the total weight of the curable resin composition, the UV absorbent is preferably 0.0001 wt % to 0.1 wt %, more preferably 0.001 wt % to 0.1 wt %.

Specific examples of the UV absorbent include, for example, salicylates such as phenyl salicylate, p-t-butylphenyl salicylate, and p-octyl phenyl salicylate, benzophenones such as 2,4-dihydroxybenzophenone, 2-hydroxy-4-methoxybenzophenone, 2-hydroxy-4-octyloxybenzophenone, 2-hydroxy-4-dodecyloxy benzophenone, 2,2'-dihydroxy-4-methoxybenzophenone, 2,2'-dihydroxy-4,4'-dimethoxybenzophenone, and 2-hydroxy-4-methoxy-5-sulfobenzophenon, benzotriazoles such as 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3', 5'-di-t-amyl phenyl)benzotriazole, and 2-{(2'-hydroxy-3',", 4",5",6"-tetrahydrophthalimidomethyl)-5'-methylphenyl}benzotriazole, and hindered amines such as bis(2,2,6,6-tetramethyl-4-piperidyl)sebacate, bis(1,2,2,6,6-pentamethyl-4-piperidyesebacate, bis(1,2,2,6,6-pentamethyl-4-piperidyl) [{3,5-bis(1,1-dimethylethyl)-4-hydroxylphenyl}methyl]butyl malonate.

<Other Ingredients>

Moreover, the curable resin composition may also contain any other ingredient such as an active energy ray sensitizer, a polymerization inhibitor, a polymerization co-initiator, a leveling agent, a wettability modifier, a surfactant, a plasticizer, an anti-static agent, a silane coupling agent, a curing aid.

A curing aid capable of improving the adhesion between the hard coat layer of the present invention and the base material may be, for example, compounds having 2 or more thiol in 1 molecule. Specific examples include, for example, hexanedithiol, decanedithiol, 1,4-dimethylmercaptobenzene, butanediol bisglycolate, ethylene glycol bisthioglycolate, trimethylol propanetristhioglycolate, butanediol bisthiopropionate, trimethylol propanetristhio propionate, trimethylol propanetristhioglycolate, pentaerythritol tetrakisthio propionate, pentaerythritol tetrakisthioglycolate, trishydroxylethyl tristhiopropionate, 1,4-bis(3-mercaptobutyryloxy)butane (trade name: Karenz MT BD1, manufactured by Showa Denko KK), and pentaerythritol tetrakis(3-mercaptobutyrate) (trade name: Karenz MT PE1, manufactured by Showa Denko KK), 1,3,5-tris(3-mercaptobutyloxy ethyl)-1, 3,5-triazin-2,4,6(1H,3H,5H)-trione (trade name: Karenz MT NR1, manufactured by Showa Denko KK).

<Laminated Body, Optical Film, and Preparation Methods Thereof>

The laminated body and the optical film may be fabricated by coating the curable resin composition or the coating solution containing the curable resin composition of the present invention on a single surface of a base material to form a layer, and irradiating energy (for example, heat and active energy ray) sufficient for curing the layer of the curable resin composition or the coating solution containing the curable resin composition, to harden the layer. The layer formed by curing the curable resin composition or the coating solution containing the curable resin composition is a hard coat layer, which can improve the scratch resistance and abrasion resistance of the base material. In case that the base material is an optical film, the hard coat layer may be formed on both surfaces of the optical film.

The laminated body and the optical film may be fabricated with the curable resin composition through a method below. The laminated body and the optical film of the present invention may be obtained by forming a layer of the curable resin composition or the coating solution containing the curable resin composition of the present invention, and curing the layer.

The layer may be formed by, for example, coating the curable resin composition or the coating solution containing the curable resin composition on the base material.

The coating method is not particularly limited and may be, for example, spin coating, roller coating, slit coating, dip coating, spray coating, gravure print coating, reversed coating, rod coating, bar coating, die coating, kiss coating, reverse kiss coating, air-knife coating, and curtain coating.

Examples of the coated base material include, for example, a glass substrate such as a whiteboard glass, a soda lime glass, and a silica coated soda lime glass; a synthetic resin film of, for example, polycarbonate, polyester, acrylic resin, vinyl chloride resin, aromatic polyamide resin, polyamide-imide, polyimide, triacetate, and diacetate; a transparent resin substrate of, for example, cycloolefin resin including norbornene resin (trade name: ZEONOR and ZEONEX, from ZEON Co., Ltd; and trade name: ARTON, from JSR Co., Ltd), methacrylstyrene, polysulfone, alicyclic acrylic resin, and polyarylate, for use in optical application; a metal substrate such as aluminum plate, copper plate, nickel plate, and stainless steel plate; other ceramic plates, and semiconductor substrates having a photo-electricity converting element; urethane rubber, and styrene rubber. The base materials may be pretreated, and examples of pre-treatment include, for example, chemical treatment using silane coupling agent, sand blasting, corona discharge treatment, UV treatment, plasma treatment, ion plating, spluttering, gas phase reaction, and vacuum evaporation.

In case that the solvent is used, the curing of the layer optionally needs drying first, and then performing at least one step of the heating and the active energy ray irradiation.

The drying of the coated curable resin composition or the coating solution containing the curable resin composition may be carried out at a gasification temperature of the solvent used, and is generally carried out at room temperature (ca. 25° C.) to 120° C. In the heating step, the thermosetting resin may be cured in an environment from a thermosetting starting temperature to about 200° C. In case that the active energy ray polymerization initiator is used as the curing agent, the thermosetting resin is cured by irradiating optically active energy ray with an active energy ray source or irradiating electron beam after drying. The active energy ray source is not particularly limited, and may be, for example, low-voltage mercury lamp, high-voltage mercury lamp, ultra high-voltage mercury lamp, metal halide lamp, carbon arc, xenon arc, gas laser, solid laser, and electron beam irradiator, according to the nature of the active energy ray polymerization initiator used.

The thickness of the hard coat layer is not particularly limited, and is generally 0.1 μm to 50 μm, preferably 0.1 μm to 25 μm, and more preferably 0.1 μm to 10 μm. Moreover, in case that the base material is an optical film, the thickness is not particularly limited, and is generally 0.1 mm to 1 mm, preferably 0.1 μm to 500 μm, and more preferably 20 μm to 300 μm.

In case that the laminated body is used as an optical film, the base material is not particularly limited, as long as it is one material used in the optical film, and may be, for example, polyethylene terephthalate, polyethylene naphthalate, polycarbonate, polymethyl methacrylate, polyurethane, diacetyl cellulose, triacetyl cellulose, polyimide, and polyether sulfone. Among the compounds, in view of their applicability in displays and touch panels, polyethylene terephthalate, polyethylene naphthalate, polycarbonate, diacetyl cellulose, and triacetyl cellulose are preferred. The film used may also be commercially available. For example, as a polyethylene terephthalate film having a thickness of 100 μm, Lumirror 100-U34 (trade name) manufactured by Toray Co. Ltd may be used.

<Use>

The optical film of the present invention may be used in displays such as liquid crystal displays (LCDs), plasma display panels, and organic electroluminescence displays, touch panels of household appliances, and protection films of glasses, and is especially suitable for use in touch panels requiring abrasion resistance.

EXAMPLES

The present invention is further described in detail with reference to the following examples, but the present invention is not limited thereto.

In the present invention, the following determination methods are used.

1) Mohs Hardness and Average Particle Diameter of Inorganic Particles

The Mohs hardness of the inorganic particles may be determined by determining the presence of a scratch after scratching a standard substance with the test object inorganic particles using a Mohs hardness meter manufactured by Nichika Inc. Moreover, the average particle diameter of the inorganic particles is determined by dynamic light scattering using a particle diameter measurement instrument (ELS-500SD) manufactured by Otsuka Electronics Co., Ltd. The test object inorganic particles are diluted with methylisobutyl ketone (MIBK) to a content of 0.1 wt % for dispersion, and then the resulting dispersion is determined with the instrument above, so as to calculate the average particle diameter through a cumulant method.

2) Film Thickness

Film Thickness of the Hard Coat Layer

The film thickness of the coated surface and the uncoated surface is determined with a Digimicro MF-501+TC-101 COUNTER manufactured by Nikon Corporation, and the film thickness of the hard coat layer is calculated according to the difference therebetween.

Film Thickness of the Base Material

The film thickness of the base material is determined with a Digimicro MF-501+TC-101 COUNTER manufactured by Nikon Corporation.

3) Scratch Resistance and Abrasion Resistance

The scratch resistance and the abrasion resistance are determined with an abrasion resistance tester Model IMC-1557 manufactured by Imoto Co., Ltd. The determination conditions include vertical load of 1 kg, reciprocating speed of 30 times/min, reciprocating distance of 100 mm, reciprocating times of 1000, and a mounted portion of an abrasive cloth having a diameter of 10 mm. The abrasive cloth used is steel wool (#0000).

Scratch of the coat surface of the laminated body after 1000 times of reciprocating was evaluated through visual observation (that is, scratch resistance evaluation).

The evaluation standards are as follows:

x: scratches can be obviously identified through visual observation;

○: a few scratches is identified through visual observation; and

◎: no scratch is identified through visual observation.

Moreover, the haze of the laminated body before and after the abrasion resistance test is determined using a haze meter NDH5000 manufactured by Nippon Denshoku Industries Ltd., based on JIS K 7105. The haze difference before and after the abrasion resistance test is calculated and used for evaluating the abrasion resistance.

Herein, the initial haze is the haze (%) of the laminated body before the abrasion resistance test, and the haze difference is the difference between the haze (%) of the laminated body before the abrasion resistance test and the haze (%) of the laminated body after the abrasion resistance test. In the evaluation standards, if the haze difference is below 3, the abrasion resistance is considered as good.

Example 1

A curable resin composition was prepared by mixing the following compounds at a ratio below: as the inorganic particle (a-1), 25 wt % of alumina (C.I.Kasei CO., LTD.) having a Mohs hardness of 9 and an average particle diameter of 30 nm (catalog value); as the inorganic particle (a-2), 10 wt % of tin oxide (C.I.Kasei CO., LTD.) having a Mohs hardness of 6.5 and an average particle diameter of 30 nm (catalog value); as the inorganic particle (a-3), 5 wt % of cryolite (C.I.Kasei CO., LTD.) having a Mohs hardness of 2.5 to 3 and an average particle diameter of 30 nm (catalog value); as the curable resin, 40 wt % of active energy ray-curable resin pentaerythritol triacrylate (Toagosei Co., Ltd; ARONIX (trade name) M-305) and 15 wt % of tripropylene glycol diacrylate (Shinnakamura Chemical Co., Ltd; NK ESTER (trade name) APG-200); and as the curing agent, 5 wt % of Irgacure (Ciba Japan K.K.; (registered trade mark) 907).

In 10 g the resulting curable resin composition, 15 g methylisobutyl ketone (MIBK) were added as solvent, dispersed, and mixed, to prepare a coating solution.

The resulting coating solution was coated on a 210 cm×297 cm single surface of a polyethylene terephthalate film (thickness: 100 μm, COSMOSHINE (trade name) A4300) manufactured by TOYOBO Co., Ltd using a coating rod (#12) manufactured by R.D. SPECIALTIES.

The resulting film with the coat attached was dried for 1 min in a high-temperature chamber of 80° C., and irradiated with UV with an illumination of 200 mW/cm$^2$, and a quantity of exposure of 500 mJ/cm$^2$ by using a conveyor-type UV irradiator fitted with a high-voltage mercury lamp (H08-L41, rated power density of 160 W/cm) manufactured by Iwasaki Electric Co., Ltd, to obtain a laminated body having a transparent hard coat layer with a film thickness of 5 μm. The quantity of exposure was measured using an illuminometer (UVPF-A 1/PD-365) manufactured by Iwasaki Electric Co., Ltd.

The scratch of the obtained laminated body was determined using the abrasion resistance tester, and then the haze was determined, to evaluate the scratch resistance and the abrasion resistance. The evaluation results are shown in Table 1.

Example 2

A curable resin composition was prepared by mixing the following compounds at a ratio below: for the inorganic particle (a-1), 30 wt % of alumina (C.I.Kasei CO., LTD.) having a Mohs hardness of 9 and an average particle diameter of 30 nm (catalog value); for the inorganic particle (a-2), 5 wt % of tin oxide (C.I.Kasei CO., LTD.) having a Mohs hardness of 6 to 7 and an average particle diameter of 30 nm (catalog value);

for the inorganic particle (a-3), 5 wt % of cryolite (C.I.Kasei CO., LTD.) having a Mohs hardness of 2.5 to 3 and an average particle diameter of 30 nm (catalog value); for the curable resin, 40 wt % of active energy ray-curable resin pentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG-200); and for the curing agent, 5 wt % of Irgacure (Ciba Japan K.K.; (registered trade mark) 907).

The same operations as those in Example 1 were performed, to prepare a coating solution.

A laminated body was fabricated using the resulting coating solution, following the same operations as those in Example 1. A film thickness of the obtained hard coat layer was 5 μm. An abrasion resistance test and a scratch resistance test were performed on the obtained laminated body. The evaluation results are shown in Table 1.

Example 3

A curable resin composition was prepared by mixing the following compounds at a ratio below: for the inorganic particle (a-1), 20 wt % of alumina (C.I.Kasei CO., LTD.) having a Mohs hardness of 9 and an average particle diameter of 30 nm (catalog value); for the inorganic particle (a-2), 15 wt % of tin oxide (C.I.Kasei CO., LTD.) having a Mohs hardness of 6 to 7 and an average particle diameter of 30 nm (catalog value); for the inorganic particle (a-3), 5 wt % of cryolite (C.I.Kasei CO., LTD.) having a Mohs hardness of 2.5 to 3 and an average particle diameter of 30 nm (catalog value); for the curable resin, 40 wt % of active energy ray-curable resin pentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG-200); and for the curing agent, 5 wt % of Irgacure (Ciba Japan K.K.; (registered trade mark) 907).

The same operations as those in Example 1 were performed, to prepare a coating solution.

A laminated body was fabricated using the resulting coating solution, following the same operations as those in Example 1. A film thickness of the obtained hard coat layer was 5 μm. An abrasion resistance test and a scratch resistance test were performed on the obtained laminated body. The evaluation results are shown in Table 1.

Comparative Example 1

A curable resin composition was prepared by mixing the following compounds at a ratio below: for the inorganic particle (a-1), 40 wt % of alumina (C.I.Kasei CO., LTD.) having a Mohs hardness of 9 and an average particle diameter of 30 nm (catalog value); for the curable resin, 40 wt % of active energy ray-curable resin pentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG-200); and for the curing agent, 5 wt % of Irgacure (Ciba Japan K.K.; (registered trade mark) 907).

The same operations as those in Example 1 were performed, to prepare a coating solution.

A laminated body having a hard coat layer with a film thickness of 5 μm was fabricated using the resulting coating solution, following the same operations as those in Example 1. An abrasion resistance test and a scratch resistance test were performed on the obtained laminated body. The evaluation results are shown in Table 1.

Comparative Example 2

A curable resin composition was prepared by mixing the following compounds at a ratio below: for the inorganic particle (a-1), 20 wt % of alumina (C.I.Kasei CO., LTD.) having a Mohs hardness of 9 and an average particle diameter of 30 nm (catalog value); as the inorganic particle (a-2), 20 wt % of tin oxide (C.I.Kasei CO., LTD.) having a Mohs hardness of 6 to 7 and an average particle diameter of 30 nm (catalog value); for the curable resin, 40 wt % of active energy ray-curable resinpentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG-200); and for the curing agent, 5 wt % of Irgacure (Ciba Japan K.K.; (registered trade mark) 907).

The same operations as those in Example 1 were performed, to prepare a coating solution.

A laminated body was fabricated using the resulting coating solution, following the same operations as those in Example 1. A film thickness of the obtained hard coat layer was 5 μm. An abrasion resistance test and a scratch resistance test were performed on the obtained laminated body. The evaluation results are shown in Table 1.

Comparative Example 3

A curable resin composition was prepared by mixing the following compounds at a ratio below: for the inorganic particle (a-1), 20 wt % of alumina (C.I.Kasei CO., LTD.) having a Mohs hardness of 9 and an average particle diameter of 30 nm (catalog value); for the inorganic particle (a-3), 20 wt % of cryolite (C.I.Kasei CO., LTD.) having a Mohs hardness of 2.5 to 3 and an average particle diameter of 30 nm (catalog value); as the curable resin, 40 wt % of active energy ray-curable resin pentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG-200); and for the curing agent, 5 wt % of Irgacure (Ciba Japan K.K.; (registered trade mark) 907).

The same operations as those in Example 1 were performed, to prepare a coating solution.

A laminated body was fabricated using the resulting coating solution, following the same operations as those in Example 1. A film thickness of the obtained hard coat layer was 5 μm. An abrasion resistance test and a scratch resistance test were performed on the obtained laminated body. The evaluation results are shown in Table 1.

Comparative Example 4

A curable resin composition was prepared by mixing the following compounds at a ratio below: for the inorganic particle (a-1), 25 wt % of alumina (C.I.Kasei CO., LTD.) having a Mohs hardness of 9 and an average particle diameter of 30 nm (catalog value); for the inorganic particle (a-2), 2 wt % of tin oxide (C.I.Kasei CO., LTD.) having a Mohs hardness of 6.5 and an average particle diameter of 30 nm (catalog value); as the inorganic particle (a-3), 13 wt % of cryolite (C.I.Kasei CO., LTD.) having a Mohs hardness of 2.5 to 3 and an average particle diameter of 30 nm (catalog value); for the curable resin, 40 wt % of active energy ray-curable resin pentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG- 200); and for the curing agent, 5 wt % of Irgacure (Ciba Japan K.K.; (registered trade mark) 907).

The same operations as those in Example 1 were performed, to prepare a coating solution.

A laminated body was fabricated using the resulting coating solution, following the same operations as those in Example 1. A film thickness of the obtained hard coat layer was 5 μm. An abrasion resistance test and a scratch resistance test were performed on the obtained laminated body. The evaluation results are shown in Table 1.

Comparative Example 5

A curable resin composition was prepared by mixing the following compounds at a ratio below: for the inorganic particle (a-1), 7 wt % of alumina (C.I.Kasei CO., LTD.) having a Mohs hardness of 9 and an average particle diameter of 30 nm (catalog value); for the inorganic particle (a-2), 30 wt % of tin oxide (C.I.Kasei CO., LTD.) having a Mohs hardness of 6.5 and an average particle diameter of 30 nm (catalog value); as the inorganic particle (a-3), 3 wt % of cryolite (C.I.Kasei CO., LTD.) having a Mohs hardness of 2.5 to 3 and an average particle diameter of 30 nm (catalog value); as the curable resin, 40 wt % of active energy ray-curable resin pentaerythritol triacrylate (Toagosei Co., Ltd; ARONIX (trade name) M-305), and 15 wt % of tripropylene glycol diacrylate (Shin-nakamura Chemical Co., Ltd; NK ESTER (trade name) APG-200); and for the curing agent, 5 wt % of Irgacure (Ciba Japan K.K.; (registered trade mark) 907).

The same operations as those in Example 1 were performed, to prepare a coating solution.

A laminated body was fabricated using the resulting coating solution, following the same operations as those in Example 1. A film thickness of the obtained hard coat layer was 5 μm. An abrasion resistance test and a scratch resistance test were performed on the obtained laminated body. The evaluation results are shown in Table 1.

ticle of alumina having a Mohs hardness of 9 and the inorganic particle of tin oxide having a Mohs hardness of 6.5, or the laminated body of Comparative Example 3 fabricated using the inorganic particle of alumina having a Mohs hardness of 9 and cryolite having a Mohs hardness of 2.5 to 3, the laminated body of Example 1 fabricated using the inorganic particle of alumina having a Mohs hardness of 9, the inorganic particle of tin oxide having a Mohs hardness of 6.5, and cryolite having a Mohs hardness of 2.5 to 3 in combination has the good result that as far as the scratch resistance, and the abrasion resistance are concerned, the laminated body is hard to be scratched, and the haze difference is small.

Furthermore, as for the laminated bodies of Comparative Examples 4 and 5, though three inorganic particles are used in combination like that in Example 1, as far as scratch resistance is concerned, the laminated bodies are easily scratched. The reason is that the contents of the three inorganic particles in the coats of the laminated bodies do not fall into the content range of the present invention, and thus the scratch resistance does not be imparted sufficiently.

APPLICABILITY IN INDUSTRY

The laminated body of the present invention is useful as an optical film such as a polarizer protective film, a retardation film, and a touch panel film, and a substrate such as a three-dimensional decorative film, a film substrate for flat panel displays, a plastic film substrate for LCDs, a substrate for organic EL displays, a substrate for electronic paper, a substrate for solar cells, an optical disc substrate, a transparent conductive film substrate, and a thin film transistor (TFT) substrate.

What is claimed is:

1. A hard coat layer, formed by curing a curable resin composition, wherein the curable resin composition comprising inorganic particles, a curable resin and a curing agent wherein the curable resin is an active energy ray-curable

TABLE 1

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Inorganic particle (a-1) | Material | $Al_2O_3$ | $Al_2O_3$ | $Al_2O_3$ | $Al_2O_3$ | $Al_2O_3$ | $Al_2O_3$ | $Al_2O_3$ | $Al_2O_3$ |
| | Mohs hardness | 9 | 9 | 9 | 9 | 9 | 9 | 9 | 9 |
| | Average particle diameter | 30 nm | 30 nm | 30 nm | 30 nm | 30 nm | 30 nm | 30 nm | 30 nm |
| Inorganic particle (a-2) | Material | $SnO_2$ | $SnO_2$ | $SnO_2$ | | $SnO_2$ | | $SnO_2$ | $SnO_2$ |
| | Mohs hardness | 6.5 | 6.5 | 6.5 | | 6.5 | | 6.5 | 6.5 |
| | Average particle diameter | 30 nm | 30 nm | 30 nm | | 30 nm | | 30 nm | 30 nm |
| Inorganic particle (a-3) | Material | Cryolite | Cryolite | Cryolite | | | Cryolite | Cryolite | Cryolite |
| | Mohs hardness | 2.5 to 3.0 | 2.5 to 3.0 | 2.5 to 3.0 | | | 2.5 to 3.0 | 2.5 to 3.0 | 2.5 to 3.0 |
| | Average particle diameter | 30 nm | 30 nm | 30 nm | | | 30 nm | 30 nm | 30 nm |
| Scratch resistance | Scratch | ◎ | ○ | ○ | X | X | X | X | X |
| Abrasion resistance | Initial haze | 3.2 | 3.4 | 3.7 | 3.3 | 3.8 | 3.3 | 3.3 | 3.7 |
| | Haze difference | 0.5 | 3 | 1.5 | 9 | 2 | 0.7 | 3.4 | 3.1 |

Compared with the laminated body of Comparative Example 1 fabricated using the inorganic particle of alumina having a Mohs hardness of 9 alone, the laminated body of Comparative Example 2 fabricated using the inorganic parresin, the inorganic particles comprise an inorganic particle (a-1) having a Mohs hardness of 7 or more and an average particle diameter of 10 to 50 nm, an inorganic particle (a-2) having a Mohs hardness of 4 or more to less than 7 and an average particle diameter of 10 to 50 nm, and an inorganic particle (a-3) having a Mohs hardness of less than 4 and an average particle diameter of 10 to 50 nm; the curable resin is at least one selected from the group consisting of a thermosetting resin and an active energy ray-curable resin; and based on a total weight of the curable resin composition, a content of the inorganic particle (a-1) is from 20 wt % to 60 wt %, a content of the inorganic particle (a-2) is from 5 wt % to 20 wt %, a content of the inorganic particle (a-3) is from 0.1 wt % to 5 wt %, a content of the curable resin is from 15 wt % to 74 wt % and a content of the curing agent is from 0.1 wt % to 10 wt %, wherein the inorganic particle (a-1) is at least one selected from alumina and silica, the inorganic particle (a-2) is at least one selected from tin oxide, zirconia, cerium oxide, magnesium fluoride, copper oxide, apatite, fluorite, and ferric oxide, and the inorganic particle (a-3) is at least one selected from cryolite, calcite, gypsum, and talc, and the hard coat layer has a thickness of 10 μm or less.

2. A laminated body, formed by laminating the hard coat layer according to claim 1 on a base material.

3. The laminated body according to claim 2, wherein the base material is a synthetic resin film, a glass substrate, a ceramic substrate, a semiconductor substrate, or a metal substrate.

4. The laminated body according to claim 2, wherein the hard coat layer is laminated on a single surface or both surfaces of the base material.

5. An optical film, formed by the laminated body according to claim 2.

6. A touch panel, comprising the optical film according to claim 5.

7. A hard coat layer, formed by curing a coating solution, wherein the coating solution formed by a curable resin composition and a solvent, and the curable resin composition comprising inorganic particles, a curable resin and a curing agent wherein the curable resin is an active energy ray-curable resin, the inorganic particles comprise an inorganic particle (a-1) having a Mohs hardness of 7 or more and an average particle diameter of 10 to 50 nm, an inorganic particle (a-2) having a Mohs hardness of 4 or more to less than 7 and an average particle diameter of 10 to 50 nm, and an inorganic particle (a-3) having a Mohs hardness of less than 4 and an average particle diameter of 10 to 50 nm; the curable resin is at least one selected from the group consisting of a thermosetting resin and an active energy ray-curable resin; and based on a total weight of the curable resin composition, a content of the inorganic particle (a-1) is from 20 wt % to 60 wt %, a content of the inorganic particle (a-2) is from 5 wt % to 20 wt %, a content of the inorganic particle (a-3) is from 0.1 wt % to 5 wt %, a content of the curable resin is from 15 wt % to 74 wt % and a content of the curing agent is from 0.1 wt % to 10 wt %, wherein the inorganic particle (a-1) is at least one selected from alumina and silica, the inorganic particle (a-2) is at least one selected from tin oxide, zirconia, cerium oxide, magnesium fluoride, copper oxide, apatite, fluorite, and ferric oxide, and the inorganic particle (a-3) is at least one selected from cryolite, calcite, gypsum, and talc, and the hard coat layer has a thickness of 10 μm or less.

8. A laminated body, formed by laminating the hard coat layer according to claim 7 on a base material.

9. The laminated body according to claim 8, wherein the base material is a synthetic resin film, a glass substrate, a ceramic substrate, a semiconductor substrate, or a metal substrate.

10. The laminated body according to claim 8, wherein the hard coat layer is laminated on a single surface or both surfaces of the base material.

11. An optical film, formed by the laminated body according to claim 8.

12. A touch panel, comprising the optical film according to claim 11.

* * * * *